(12) United States Patent
Ghodrat et al.

(10) Patent No.: US 8,305,884 B2
(45) Date of Patent: Nov. 6, 2012

(54) SYSTEMS AND METHODS FOR A SELF-HEALING CARRIER ETHERNET TOPOLOGY

(75) Inventors: Morteza Ghodrat, Kanata (CA); Michael Gazier, Ottawa (CA); Ian Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 334 days.

(21) Appl. No.: 11/855,596

(22) Filed: Sep. 14, 2007

(65) Prior Publication Data

US 2009/0073988 A1    Mar. 19, 2009

(51) Int. Cl.
*G01R 31/08* (2006.01)
*G06F 11/00* (2006.01)
*G08C 15/00* (2006.01)
(52) U.S. Cl. ........................................ 370/228
(58) Field of Classification Search .................. 370/248, 370/249, 224, 217, 222, 223
See application file for complete search history.

(56) References Cited

U.S. PATENT DOCUMENTS

| | | | |
|---|---|---|---|
| 6,023,467 A * | 2/2000 | Abdelhamid et al. ..... | 370/236.2 |
| 6,256,292 B1 * | 7/2001 | Ellis et al. ..................... | 370/227 |
| 6,538,987 B1 * | 3/2003 | Cedrone et al. .............. | 370/216 |
| 6,728,207 B1 * | 4/2004 | Askinger et al. ............. | 370/224 |
| 7,188,280 B2 * | 3/2007 | Shinomiya et al. ........... | 714/43 |
| 7,813,263 B2 * | 10/2010 | Chang et al. ................. | 370/216 |
| 2005/0038326 A1 | 2/2005 | Mathur | |
| 2005/0111350 A1 * | 5/2005 | Kano ............................ | 370/216 |
| 2007/0014290 A1 * | 1/2007 | Dec et al. ..................... | 370/390 |
| 2007/0242604 A1 * | 10/2007 | Takase et al. ................. | 370/223 |
| 2008/0095047 A1 * | 4/2008 | Skalecki et al. .............. | 370/225 |
| 2010/0226244 A1 * | 9/2010 | Mizutani et al. ............. | 370/220 |

OTHER PUBLICATIONS

PBB-TE ESP 1:1 protection Switching, David W.Martin, Nortel networks, IEEE 802.1, Sep. 4-7, 2007 Stockholm, entire document.*
International Search Report and Written Opinion of the International Searching Authority (Form PCT/ISA/220); PCT Application No. PCT/US2008/072943, Nov. 14, 2008.
International Preliminary Report on Patentability (Form PCT/IPEA/416); PCT Application No. PCT/US2008/072943, Aug. 11, 2010.

* cited by examiner

*Primary Examiner* — Mark Rinehart
*Assistant Examiner* — Maharishi Khirodhar
(74) *Attorney, Agent, or Firm* — Clements Bernard PLLC; Christopher L. Bernard; Lawrence A. Baratta, Jr.

(57) ABSTRACT

Systems and methods for self-healing Ethernet topologies which are compatible with PBT, which use standards-based protocols, which do not self-configure, and which use Ethernet OAM are provided. Interconnected nodes are configured with a primary and secondary path which is determined by VLANs, MPLS label, Provider Backbone Bridge Traffic Engineering (PBB-TE) VLAN ID (VID), Frame Relay (FR), Asynchronous Transfer Mode (ATM) Virtual Circuits (VCs), and the like. One or more head-end nodes are designated for terminating each path and for performing cross-connects between the primary and secondary paths. IEEE 802.1ag Continuity Check Messages (CCM) are transmitted by all nodes on both the primary and secondary routes. Responsive to a loss of a predetermined number of CCM messages, traffic is switched to the secondary route. In non-fault conditions, both the paths for the primary and secondary routes can carry traffic.

19 Claims, 8 Drawing Sheets

SYSTEMS AND METHODS FOR A SELF-HEALING CARRIER ETHERNET TOPOLOGY

FIELD OF THE INVENTION

The present invention relates generally to data communication networks, and more particularly, the present invention provides systems and methods for self-healing carrier Ethernet topologies which are compatible with Provider Backbone Transport (PBT), which use standards-based protocols, which do not self-configure, and which use Ethernet Operations, Administration, and Maintenance (OAM).

BACKGROUND OF THE INVENTION

Communication networks can be built in many different network topologies, such as a ring, mesh, linear, linear chain, tree, and the like. Conventionally, network protection is provided for at layers one and below, such as through SONET, SDH, and the like. Typical protection schemes can include Automatic Protection Switching (APS), Uni-directional Path Switched Rings (UPSRs), two and four fiber Bi-directional Line Switched Rings (BLSRs), and the like. However, networks are typically unprotected at layer two (e.g., Ethernet) and above. For example, Ethernet-based access and aggregation networks are typically designed in a tree structure, and thus lack network protection.

Modern networks, such as access and aggregation networks, are moving towards Ethernet as the universal medium. However, Ethernet is not quite robust enough for carrier transport applications. Ethernet standards are evolving towards carrier-grade performance, and equipment providers today provide various different solutions for Ethernet-based network protection. For example, layer zero/one protection can be provided through Ethernet-over-SONET or SDH solutions. At layer two, various solutions have been presented, such as Ethernet Protection Switching (EPS) which is not 802.1ag-based, Resilient Packet Ring (RPR), Rapid Spanning Tree Protocol (RSTP), and Spanning Tree Protocol (STP). At layer two-and-a-half, Multi-Protocol Label Switching (MPLS) fast reroute (FRR) can provide network protection. Finally, network protection can be achieved at layer three through Internet Protocol (IP)-based protection schemes, such as Open Shortest Path First (OSPF) recovery. Some of these foregoing schemes can achieve SONET/SDH-like recovery (i.e., less than 50 msec), and some cannot and require 100 msec to 30 sec to recover.

Ethernet-layer services, such as the Metro Ethernet Forum (MEF) E-LINE and E-LAN services, are rapidly growing in network deployments. Disadvantageously, current network protection approaches described herein may require the use of self-configuring networks, such as STP, which is not compatible with fixed (managed) configuration Ethernet networks, such as Provider Backbone Transport (PBT). Additionally, these schemes may require specific hardware or software for operation, such as RPR due to non-Ethernet. Further, these schemes are not IEEE 802.1ag based. IEEE 802.1ag provides Connectivity Fault Management, i.e. Ethernet Operations Administration and Maintenance (OAM). IEEE 802.1ag is a major thrust with service providers to enable carrier-grade Ethernet. Finally, some of these schemes require other protocols besides Ethernet, such as MPLS.

BRIEF SUMMARY OF THE INVENTION

In various exemplary embodiments, the present invention provides systems and methods for self-healing Ethernet topologies which are compatible with PBT, which use standards-based protocols, which do not self-configure, and which use Ethernet OAM. Interconnected nodes are configured with a primary and secondary path which is determined by Virtual Local Area Networks (VLANs), MPLS label, Provider Backbone Bridge Traffic Engineering (PBB-TE) VLAN ID (VID), Frame Relay (FR), Asynchronous Transfer Mode (ATM) Virtual Circuits (VCs), and the like. One or more head-end nodes are designated for terminating each path and for performing cross-connects between the primary and secondary paths.

IEEE 802.1ag Continuity Check Messages (CCM) are transmitted by all nodes on both the primary and secondary routes. The self-healing Ethernet topology is constrained physically or logically to one of a ring or linear chain system. Accordingly, multicast CCM messages are configured to naturally traverse the physical or logical topology. Responsive to a loss of a predetermined number of CCM messages and a subsequent CCM message with a Remote Defect Indicator (RDI), traffic is switched at source nodes to the secondary route. In non-fault conditions, both the paths for the primary and secondary routes can carry traffic.

Advantageously, the present invention is compatible with fixed (managed) configuration Ethernet networks, such as PBT, and generally requires no new hardware due to the fact it uses standards-based protocols. Further, the present invention does not self-configure, i.e. it is compatible with PBT (PBB-TE), and is integrated to carrier's new requirement to use Ethernet OAM, such as IEEE 802.1ag and the like. The present invention can implement a self-healing Ethernet topology in 50 ms or less as required by emerging Carrier Ethernet networks.

In an exemplary embodiment of the present invention, a method for self-healing Carrier Ethernet includes statically provisioning a first and second path between a plurality of nodes interconnected in one of a ring and a linear chain topology, wherein one of the plurality of nodes include a head-end node configured to provide switching on the first and second paths for local and external network traffic, provisioning a management channel, transmitting data from a source node on the first path, periodically generating distinct Continuity Check Messages (CCMs) on the management channel for each of the first and second paths, monitoring the distinct CCMs to determine a failure condition within a path, responsive to the failure condition, transmitting a CCM with a Remote Defect Indicator to the source node, and switching data from the first path to the second path at the source node responsive to the CCM with the Remote Defect Indicator. The first and second paths include one of a Virtual Local Area Network (VLAN), Multi-protocol Label Switching (MPLS) label, Provider Backbone Bridge Traffic Engineering (PBB-TE) VLAN ID (VID), Frame Relay (FR), and Asynchronous Transfer Mode (ATM) Virtual Circuit (VC). The CCMs are multicast by each of the plurality of nodes, and the one of the ring and linear chain topology are operable to constrain the multicast CCMs to traversing the one of the ring and linear chain without modification of the multicast CCMs. The monitoring to determine the failure condition includes one of checking for the loss of a predetermined number of consecutive CCM messages for the first path, receiving a CCM message with a Remote Defect Indicator (RDI), loss of signal, and combinations thereof. Optionally, the first and second path are statically provisioned through one of a northbound interface, a command line interface, an Extensible Markup Language (XML) or Session Initiation Protocol (SIP) mechanism, a Provider Backbone Transport (PBT (PBB-TE)) managed system, and combinations thereof. Each of the plurality of nodes connects directly to the head-end through a dedicated VLAN providing a logical tree topology.

Optionally, the plurality of interconnected nodes include the ring topology, and wherein the management channel includes two IEEE 802.1ag CCM sessions for the ring, wherein the two IEEE 802.1ag CCM session include one in a transmit direction and one in a receive direction around the ring. Generating distinct CCMs further includes generating a first and second CCM message at a predetermined rate by a source node of the plurality of nodes, transmitting the first CCM message in a first direction around the ring, transmitting the second CCM message in a second direction around the ring, wherein the second direction is opposite from the first direction, and removing the first and second CCM messages at the source node following a full circle on the ring. Transmitting a CCM with a Remote Defect Indicator to the source node responsive to the failure condition includes when a primary path fails, generating a CCM message with the Remote Defect Indicator (RDI) turned on, wherein the CCM message is generated at a node of the plurality of nodes located on the receive side of the failed primary path, and receiving the CCM message with the Remote Detect Indicator (RDI) turned on at each of the plurality of nodes indicating a failure.

In another exemplary embodiment of the present invention, a self-healing Carrier Ethernet ring includes a plurality of nodes interconnected in a ring topology, a head-end node including one of the plurality of nodes, a primary path between each of the plurality of nodes and the head-end, a protect path between each of the plurality of nodes and the head-end, means for detecting a failure in the primary and protect path, and means for switching from the primary path to the protect path responsive to detecting the failure. The self-healing Carrier Ethernet ring further includes primary Virtual Local Area Networks (VLANs) including statically provisioned VLANs between each of the plurality of nodes and the head-end node, and protected VLANs including statically provisioned VLANs between each of the plurality of nodes and the head-end node. The primary path includes the primary VLANs and the protect path includes the protect VLANs. Each of the primary and protected VLANs is passthrough intermediate nodes of the plurality of nodes and terminated at an originating node and the head-end node. The primary and protect VLANs are statically provisioned through one of a northbound interface, a command line interface, an Extensible Markup Language (XML) or Session Initiation Protocol (SIP) mechanism, a Provider Backbone Transport (PBT (PBB-TE)) managed system, and combinations thereof. Responsive to switching from the primary path to the protect path, low priority traffic is dropped if there is oversubscription. The failure includes one the loss of a predetermined number of consecutive CCM messages, receipt of a CCM message with a Remote Defect Indicator (RDI), loss of signal, and combinations thereof.

In yet another exemplary embodiment of the present invention, a logical tree topology providing a self-healing Ethernet topology includes a plurality of head-end nodes, a plurality of nodes, wherein each node is connected to each of the plurality of head-nodes through a dedicated primary and protect path, a management channel connected to each of the plurality of head-nodes and nodes, wherein multicast Continuity Check Messages (CCMs) are generated and monitored by the plurality of head-end nodes and the plurality of nodes on the management path, and means for switching from the primary path to the protect path responsive to CCM message with an RDI flag. The logical tree topology is operable to constrain the path of the multicast CCMs. The primary and protect paths include one of a Virtual Local Area Network (VLAN), Multi-protocol Label Switching (MPLS) label, Provider Backbone Bridge Traffic Engineering (PBB-TE) VLAN ID (VID), Frame Relay (FR), and Asynchronous Transfer Mode (ATM) Virtual Circuit (VC). The plurality of head-end nodes and the plurality of nodes monitor CCM messages and responsive to a loss of a predetermined number of CCM messages, transmit a CCM message with an RDI flag. CCMs are generated at a predetermined interval from each node, each node is configured to remove CCM messages transmitted from itself following traversal of the management channel, and a node is configured to transmit the CCM message with an RDI flag responsive to the loss of a predetermined number of consecutive CCM messages. The predetermined number of consecutive CCMs and the predetermined interval are selected to provide a failure detection in less than a prescribed time required for recovery.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for self-healing Ethernet topologies. Interconnected nodes are configured with a primary and secondary path which is determined by VLANs, MPLS label, PBB-TE VID, FR, ATM VC, and the like. One or more head-end nodes are designated for terminating each path, such as a VLAN, and for performing cross-connects between the primary and secondary paths.

IEEE 802.1ag Continuity Check Messages (CCM) are transmitted by all nodes on both the primary and secondary routes. The self-healing Ethernet topology is constrained physically or logically to one of a ring or linear chain system. Accordingly, multicast CCM messages are configured to naturally traverse the physical or logical topology. Responsive to a loss of a predetermined number of CCM messages and a subsequent CCM message with an RDI flag, traffic is switched by each interconnected node to the secondary route.

Advantageously, the present invention is compatible with fixed (managed) configuration Ethernet networks, such as PBT, and generally requires no new hardware due to the fact it uses standards-based protocols. Further, the present invention does not self-configure, i.e. it is compatible with PBT (PBB-TE), and is integrated to carrier's new requirement to use Ethernet OAM, such as IEEE 802.1ag and the like. The present invention can implement a self-healing Ethernet topology in 50 ms or less as required by emerging Carrier Ethernet networks. Further, the present invention avoids the requirement to modify the multicast broadcast of CCM messages due to topologies by constraining the topology to one of a ring or linear chain.

The primary and secondary paths are operable to provide a working and protect path for Ethernet connection-oriented flows to traverse. The present invention can use any mechanism for connection-oriented flows, such as VLANs, MPLS label, PBB-TE VID, FR, ATM VC, and the like. For purposes of illustration, the present invention is described herein with regards to VLAN connections. Those of ordinary skill in the art will recognize the Ethernet protection mechanisms described herein can apply equally to VLANs, MPLS label, PBB-TE VID, FR, ATM VC, and the like.

Figure 1:
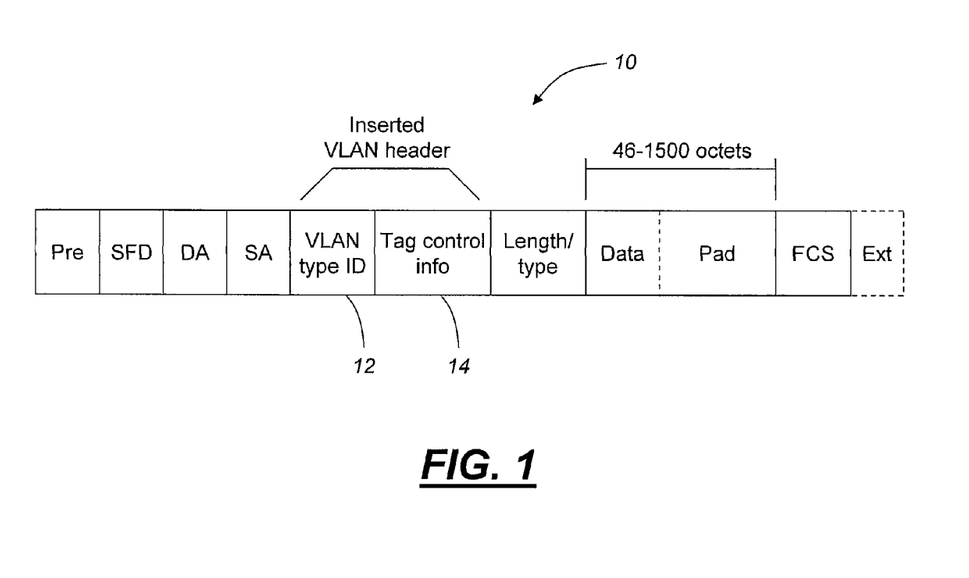
FIG. 1 is an Ethernet frame with Virtual Local Area Network (VLAN) tagging according to IEEE 802.1Q.

Referring to FIG. 1, an Ethernet frame 10 with Virtual Local Area Network (VLAN) tagging is illustrated. VLAN Tagging is defined in IEEE 802.1Q as a standard to allow multiple bridged networks to transparently share the same physical network link without leakage of information between networks (i.e. trunking). The Ethernet frame 10 in IEEE 802.1Q is not actually encapsulated. Instead, the Ether-Type value (for Ethernet II framing) in the Ethernet header is set to hex 8100, identifying this frame as an 802.1Q frame. Also, four extra bytes are added after the Ethernet header consisting of two-byte Tag Control Information (TCI). VLAN ID (VID) is a 12-bit field specifying the VLAN to which the frame 10 belongs. A value of "0" means the frame 10 does not belong to any VLAN (so that the 802.1Q header specifies only a priority), a value of "1" is used with bridges, and a value of hex FFF is reserved for implementation use; all other values can be used as VLAN identifiers, allowing up to 4093 VLANs.

VLAN tagging is a Media Access Control (MAC) option that provides three important capabilities not previously available to Ethernet network operators and users. First, it provides a quality-of-service (QoS) mechanism to expedite time-critical network traffic by setting transmission priorities for outgoing frames 10. Second, it allows stations to be assigned to logical groups to communicate across multiple LANs as though they were on a single LAN. For example, bridges and switches filter destination addresses and forward VLAN frames only to ports that serve the VLAN to which the traffic belongs. Finally, VLAN tagging simplifies network management and makes adds, moves, and changes easier to administer.

The VLAN header includes two fields: a reserved 2-byte type value, indicating that the frame is a VLAN frame, and a two-byte Tag-Control field 14 that contains both the transmission priority (0 to 7, where 7 is the highest) and a VLAN ID 12 that identifies the particular VLAN over which the frame is to be sent. The receiving MAC reads the reserved type value, which is located in the normal Length/Type field position, and interprets the received frame as a VLAN frame. If the MAC is installed in a switch port, the frame is forwarded according to its priority level to all ports that are associated with the indicated VLAN identifier. If the MAC is installed in an end station, it removes the 4-byte VLAN header and processes the frame in the same manner as a basic data frame. VLAN tagging requires that all network nodes involved with a VLAN group be equipped with the VLAN option.

Figure 2:
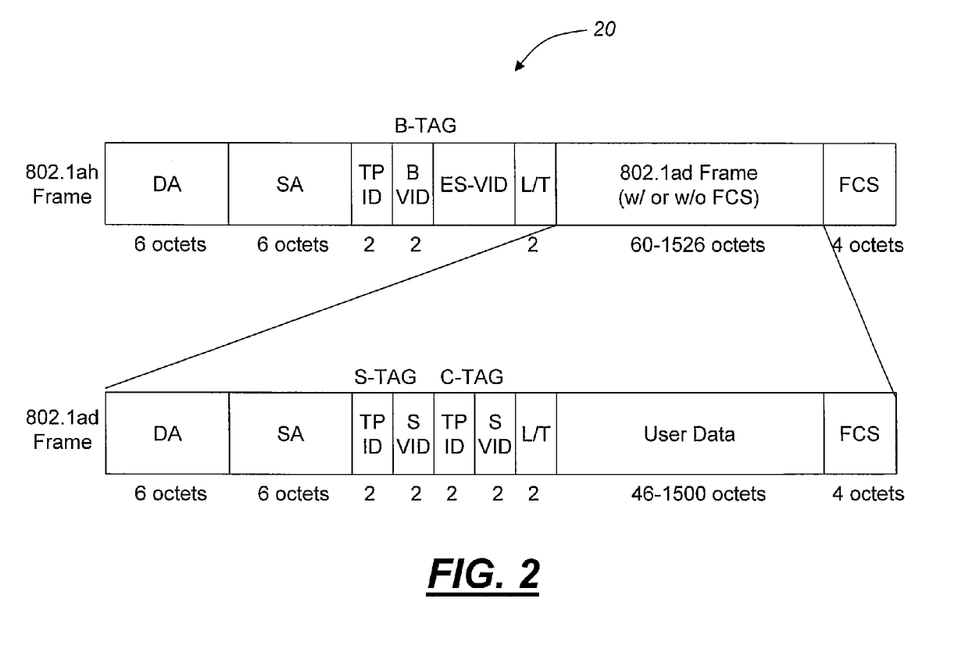
FIG. 2 is an Ethernet frame for Provider Backbone Transport (PBT) according to IEEE 802.1ah.

Referring to FIG. 2, an Ethernet frame 20 for Provider Backbone Transport (PBT) according to IEEE 802.1ah is illustrated. PBT is a set of enhancements to Ethernet technology that allows the use of Ethernet as a carrier-class transport network. PBT uses the concepts of VLAN tagging as per IEEE 802.1Q, Q-in-Q as per IEEE 802.1ad and MAC-in-MAC as per IEEE 802.1ah (Provider Backbone Bridges (PBB)) but disables the concept of flooding/broadcasting and spanning tree protocol (SPT). The idea here is to use Ethernet for connection oriented purpose as is the case with present SDH/SONET transport by stripping down the complexity involved with the present Ethernet LAN. It simplifies the OAM, as in SDH/SONET world, by using additional extensions based on IEEE 802.1ag. It also provides extensions so as to provide path protection levels similar to the UPSR protection in SDH/SONET network.

In the Ethernet frame 20, the tunnel is encoded by the destination MAC address of the backbone egress switch (B-DA) as well as a 12-bit VLAN-tag (backbone tag, B-VID). PBT forms a topology of B-DA rooted trees and an independent sink-tree is configured for each <B-DA, B-VID> pair. Since no SPT algorithm has to be performed, the trees need not be spanning. Thus, up to 4096 different trees can be configured for one B-DA.

IEEE 802.1ad (Provider Bridges) is an amendment to IEEE standard IEEE 802.1Q-1998 (also known as Q-in-Q or Stacked VLANs), intended to develop an architecture and bridge protocols to provide separate instances of the MAC services to multiple independent users of a Bridged Local Area Network in a manner that does not require cooperation among the users, and requires a minimum of cooperation between the users and the provider of the MAC service. Here, two VLAN tags are added to each customer Ethernet packet. The Ethernet VLAN tag includes both a 12-bit VLAN ID and a 3-bit priority tag.

Figure 3:
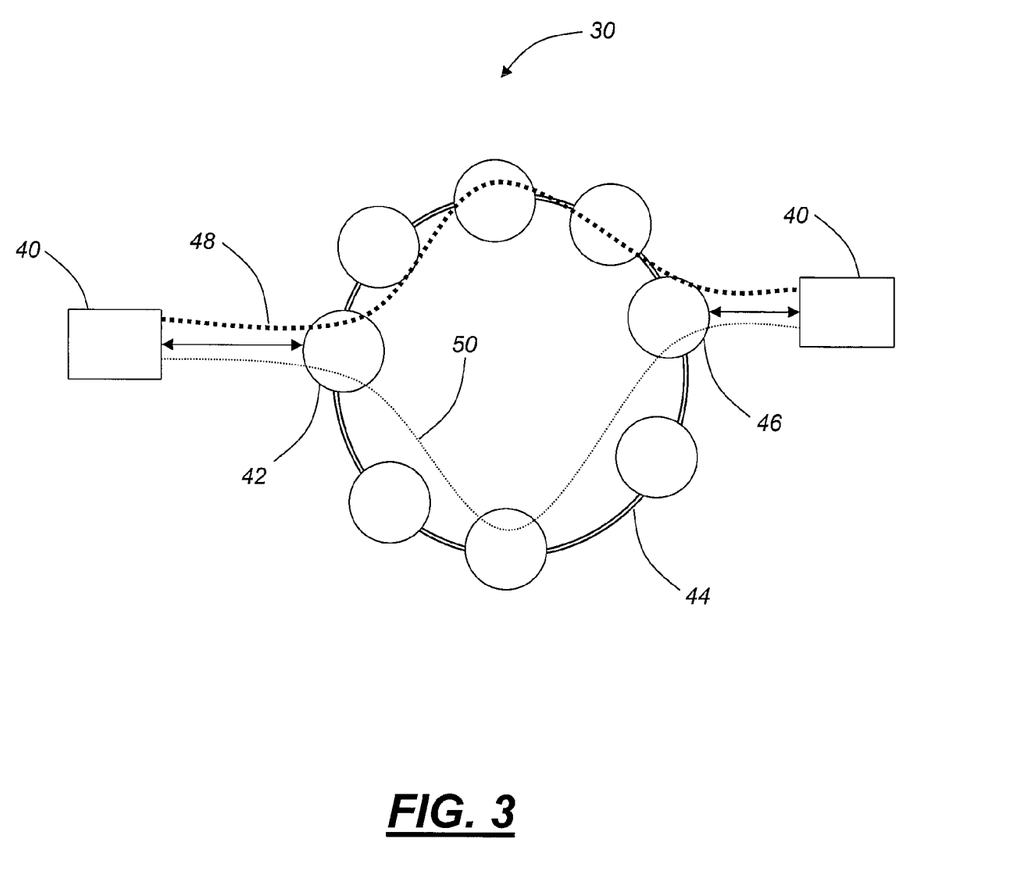
FIG. 3 is a reference network illustrating two clients connected in a self-healing Ethernet ring topology according to an exemplary embodiment of the present invention.

Referring to FIG. 3, a reference network 30 illustrates two clients 40 connected in a self-healing Ethernet ring topology 44 according to an exemplary embodiment of the present invention. The network 30 includes multiple network switches and/or routers 42 configured in the ring topology 44. The present invention designates the egress network switch and/or router 42 as a head-end node 46 and the network 30 can include multiple head-end nodes 46. The present invention provides a primary route 48 and a secondary (backup) route 50 between the clients 40, and the head-end node 46 provides termination of a connection-oriented connection, such as a VLAN, on both routes 48,50.

With regards to the architecture of the ring topology 44, there is no STP support. The nodes, i.e. switches and/or routers 42, on the ring 44 do not make routing decisions (e.g., shortest path, etc.). The traffic always flow clock wise and counter-clock wise if or when a failure is detected. This meets the no self-configuring need for PBT PBB-TE, and is a dynamic fault-recovery behavior, not a self-configured behavior such as OSPF or STP. Each switch and/or router 42 connects directly to the head-end node 46 via a dedicated VLAN essentially forming a tree topology implemented on the physical ring topology 44.

Also, the ring 44 can support multiple head-end nodes 46 through different VLANs. For example, each switch and/or router 42 can also be a head-end node 46 for a different dedicated VLAN. The multiple head-end nodes 46 can be operating at the same time, and each can subtend one or more subtended switches and/or routers 42 or VLANs. Also, the multiple head-end nodes 46 can operate as redundant or as normal nodes. Different VLANs are required for primary paths 48 and secondary paths 50 towards/from the head-end node 46 (e.g., these can be designated the primary and protected VLANs respectively). The concept of VLANs being protected implies that switches and/or routers 42 in themselves do not constitute elements of failure or elements to be protected. It is the VLAN that constitute the element of protection. This also matches the concept above that different VLAN might use different head-ends 46.

In an exemplary embodiment, customer traffic always flows over the primary VLANs while management traffic can run over both primary and protected VLANs. At each node only local traffic gets added/dropped while other VLANs will be treated as pass through, i.e. going from one network port to another. All of the VLANs are statically provisioned which can include provisioned by a northbound interface, a Command Line Interface (CLI), an Extensible Markup Language (XML) or Session Initiation Protocol (SIP) method (including PCMM/IMS based architectures), PBT (PBB-TE) managed systems, and the like. It does not mean signaled methods such as STP, OSPF, Label Distribution Protocol (LDP), Resource Reservation Protocol (RSVP), and the like.

The head-end nodes 46 are configured to provide VLAN switching for both local traffic as well as external/network traffic. Two IEEE 802.1ag Continuity Check Message (CCM) sessions are provided for the entire ring 44: one for transmit (TX) and one for receive (RX). CCMs are "heart-beat" multicast messages issued periodically by Maintenance End Points. They allow Maintenance End Points to detect loss of service connectivity amongst themselves. They also allow Maintenance End Points to discover other Maintenance End Points within a Domain, and allow Maintenance Intermediate Points to discover Maintenance End Points. In the present invention, CCM messages are sourced on special VLANs that all switches and/or routers 42 and head-end nodes 46 monitor.

CCM messages are provided to detect loss of continuity or incorrect network connections. CCMs can also be used to perform two way dual-ended Frame Loss measurements. A Flags field is incorporated in CC Messages. This field includes a bit for Remote Defect Indication (RDI) and an indication of the period at which CC Messages are transmitted.

In the present invention, CCM messages are multicast. Generally, multicast has broadcast rules associated with the input and the output interfaces. The present invention utilizes the constrained topology of either a ring or a linear chain such that multicast CCM messages naturally follow the topology of nodes without requiring modification to the multicast broadcasts. For example, a multicast CCM message arrives on an interface B which is one of four interfaces, A, B, C, and D. The CCM message subsequently is broadcast to A, C, and D, i.e. to everyone in the group except B. Even through the CCM message is multicast, it is configured to come in a particular port and subsequently broadcast on another specific port, i.e. the multicast CCM broadcast functions like a path. In the present invention, the topology, either physically or logically, is constrained to a linear chain or ring, and the multicast CCM messages follow the path even though being multicast. This avoids modification of CCM multicast to enable detection of faults in interconnected mesh topologies.

CCM messages can be generated by a source node at rate of 3.3 ms as defined by the specification, travel around the ring 44 on both primary and the protection links via special "management VLANS", and are removed by the same node after full circle on the ring 44. Additionally, the generation rate of CCM messages can be adjusted to any rate in general with 3.3 ms provided as an example. Distinct CCM messages are provided for both the primary paths 48 and secondary paths 50. When the primary path 48 fails, the node on the RX side of that path generates a CCM with the RDI flag turned on. This message still travels on the same primary path 48 and signals to all nodes 42 along the way that the link/path on its RX has failed. Accordingly, nodes 42 then switch to the protected path 50 (which becomes the primary path). Upon the reception of the RDI flag, every node 42 switches to the protected path 50 and protected VLAN—thus the traffic now flows counter-clock wise. A failure on the secondary path 50 does not cause a switch over, but does cause a major alarm.

In an exemplary embodiment of the present invention, a path failure can be detected as a result of LOS or a failure to receive a predetermined number (e.g., three) of consecutive CCMs, and both options can be supported. For example, a rate of 3.3 ms for each CCM transmission yields a detection of a failed link within approximately 10 ms if the nodes 42 are configured to switch to the protection path 50 responsive to the loss of three consecutive CCM messages.

The self-healing topology of the present invention can operate with Quality-of-Service (QoS) aspects as are known in the art since the mechanisms presented herein are compliant with standards and can operate with protocols such as PBT. Additionally, the present invention can utilize the OAM aspects as are known in the art with regards to Carrier Ethernet including northbound interfaces, SIP or XML dynamically configured, PBT (PBB-TE) managed, and the like.

Figure 4:
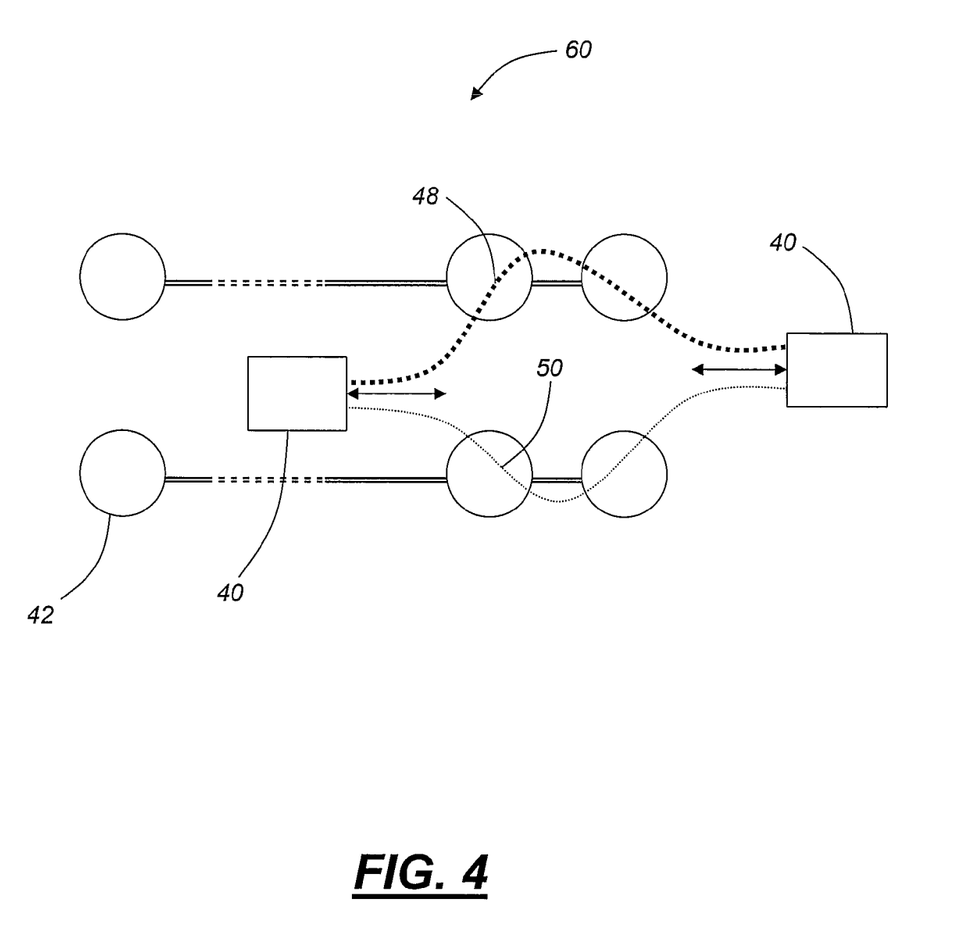
FIG. 4 is another reference network illustrating two clients connected in a self-healing Ethernet linear chain topology according to an exemplary embodiment of the present invention.

Referring to FIG. 4, another reference network illustrates two clients 40 connected in a self-healing Ethernet linear topology 60 according to an exemplary embodiment of the present invention. For illustration purposes, the linear topology 60 includes multiple network switches and/or routers 42 configured in two linear chains. The present invention can also operate over other types of linear topologies, such as intersecting linear chains, mesh, broken rings, and the like.

The linear topology 60 utilizes the same protection mechanisms described herein with regards to the ring topology 44 in FIG. 3. Specifically, there is a primary route 48 and a secondary (backup) route 50 between the clients 40. However, the linear topology includes different source and head-end nodes at the source and termination of flows. CCMs are still propagated on both the routes 48,50, and information related to the CCM messages is passed between the chains by the client 40. For example, the receive on the client 40 realizes the transmit side is no longer sending messages because the CCMs are no longer coming through indicating a failure condition. Accordingly, the client 40 sends a CCM message with the RDI flag turned on over the protection path. This is send to the far end source which correspondingly moves the transmission onto the secondary route 50.

Figure 5:
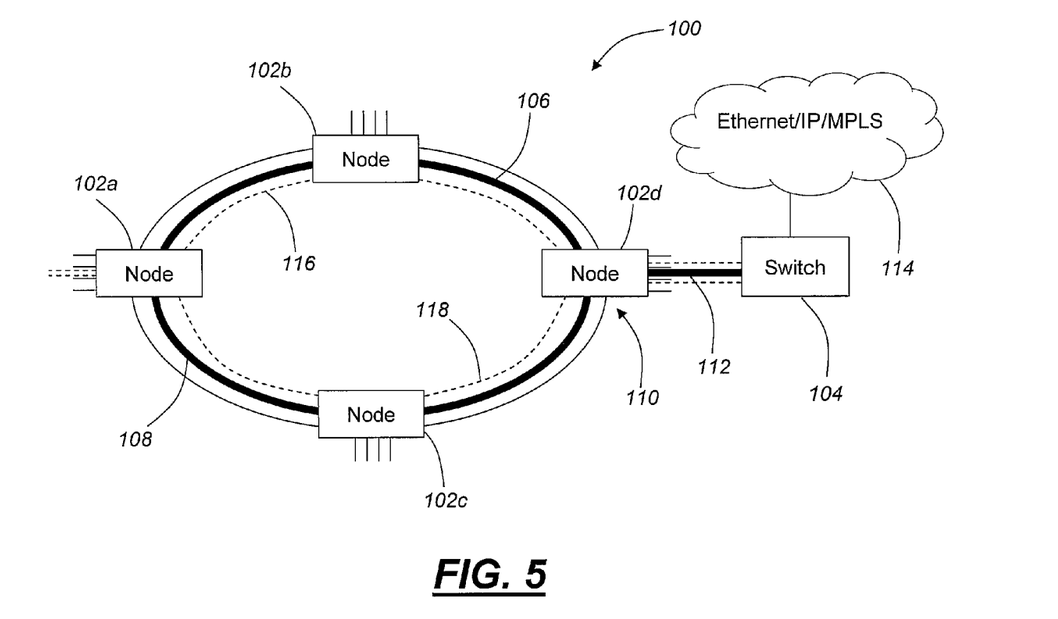
FIG. 5 is yet another reference network illustrating multiple nodes connected to a switch in a self-healing Ethernet topology according to an exemplary embodiment of the present invention.

Referring to FIG. 5, another reference network 100 illustrates multiple nodes 102a,102b,102c,102d connected to a switch 104 in a self-healing Ethernet topology according to an exemplary embodiment of the present invention. In this exemplary reference network 100, there is a pair of East and West (E+W) VLANs 106,108 from each node 102 on the ring to the node 102d which is designated as a head-end 110 node. Also, there is a separate VLAN 112 from the head-end 110 to the switch 104. The switch 104 is connected to an external network, such as an Ethernet/IP/MPLS core 114.

The nodes 102 can include Ethernet-over-Fiber Network Termination Equipment (NTE) for Carrier Ethernet transport over fiber local access connections in Gigabit Ethernet (GbE) format. The nodes 102 enable delivery of an intelligent Ethernet demarcation between customer and carrier networks and support the latest Ethernet Operations, Administration and Maintenance (OAM) capabilities for testing and monitoring of both the LAN and WAN segments. In the example of FIG. 5, the node 102a is connected a customer which is transported east and west on customer VLANs 116,118 within the ring. The customer VLANs 116,118 are within the E+W VLANs 106,108.

The switch 104 can include a multi-service carrier Ethernet platform delivering high-capacity Ethernet and IP/MPLS functionality and supporting traditional services such as Time Division Multiplexing (TDM), Asynchronous Transfer Mode (ATM), and Frame Relay (FR). The switch 104 allows service providers to facilitate the convergence of new and existing services and networks onto residential broadband, business data services, mobile wireless infrastructures, and the like.

In non-fault conditions, both the E+W VLANs 106,108 can carry traffic on the ring. At the head-end 110 node, the E+W VLANs 106,108 are merged onto the VLAN 112 towards the switch 104. When a failure is detected, i.e. through CCM messages or LOS, the affected node 102 on the ring switches traffic to the alternate VLAN. In the case of oversubscription, low priority traffic is dropped.

Figure 6:
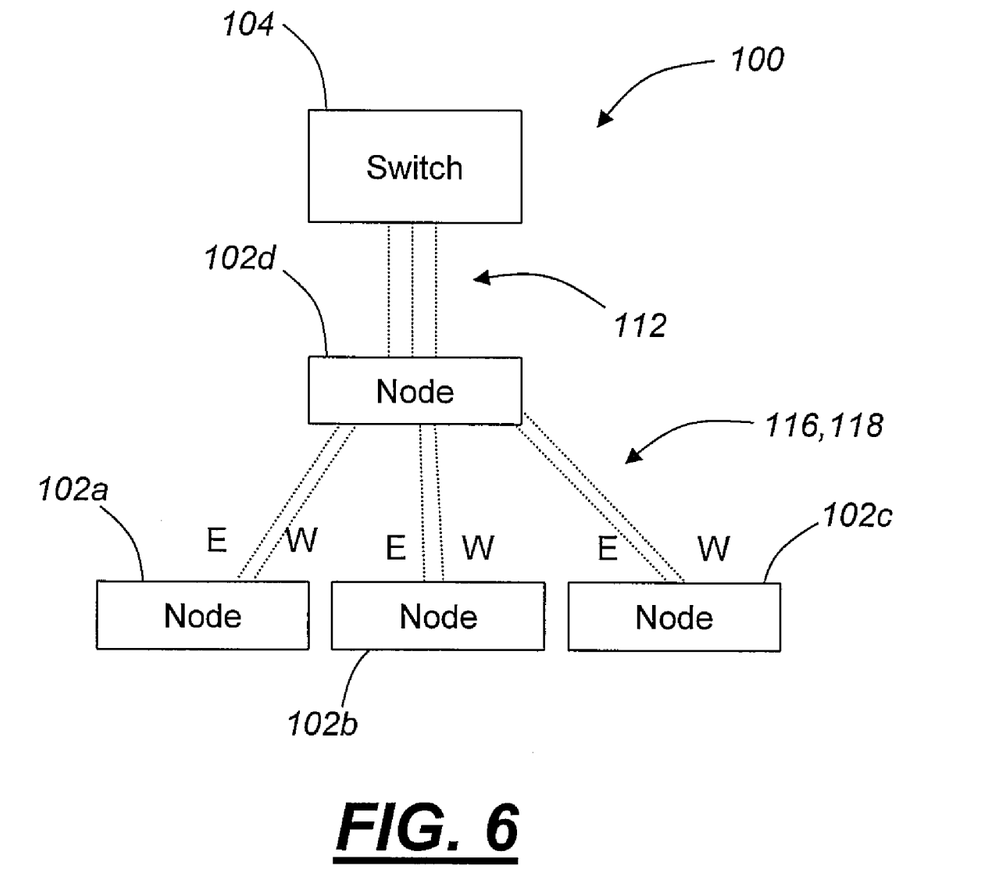
FIG. 6 is a logical tree view of the reference network of FIG. 5 with the multiple nodes connected to a switch in a self-healing Ethernet topology according to an exemplary embodiment of the present invention.

Referring to FIG. 6, a logical tree view is illustrated of the reference network 100 with the multiple nodes 102a,102b, 102c,102d connected to a switch 104 in a self-healing Ethernet topology according to an exemplary embodiment of the present invention. In the physical view of FIG. 4, the nodes 102 are connected in a ring topology. Logically, however, the nodes 102 are connected in a tree structure with the nodes 102a,102b,102c acting as leafs/nodes off of the node 102d which is the head-end 110. The head-end 110 is configured to close the ring providing terminations for the E+W VLANs 106,108 and cross-connecting these VLANs 106,108 to/from the switch 104 on the VLAN 112. The network 100 can include multiple head-end 110 nodes with each head-end 110 providing VLAN termination and cross-connecting for the self-healing topology.

Figure 7:
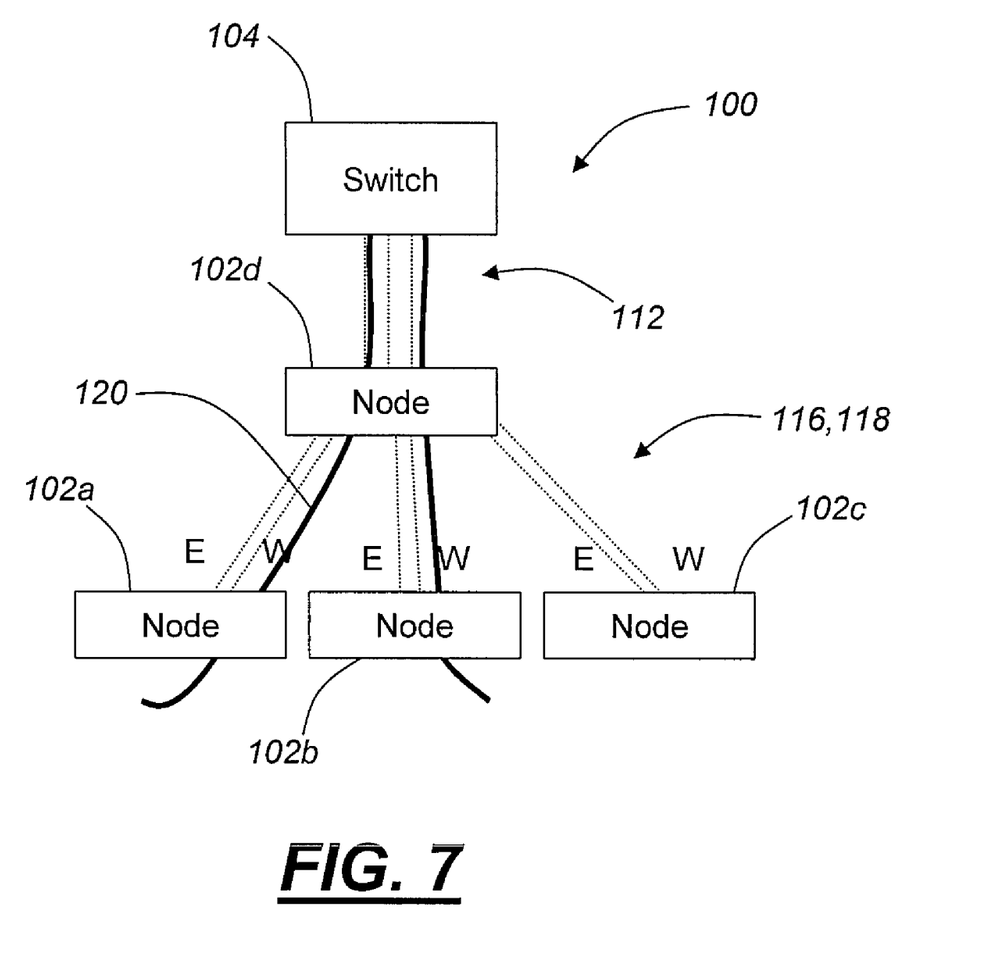
FIG. 7 is the logical tree view of FIG. 6 illustrating an exemplary flow of local ring traffic according to an exemplary embodiment of the present invention.
Figure 8:
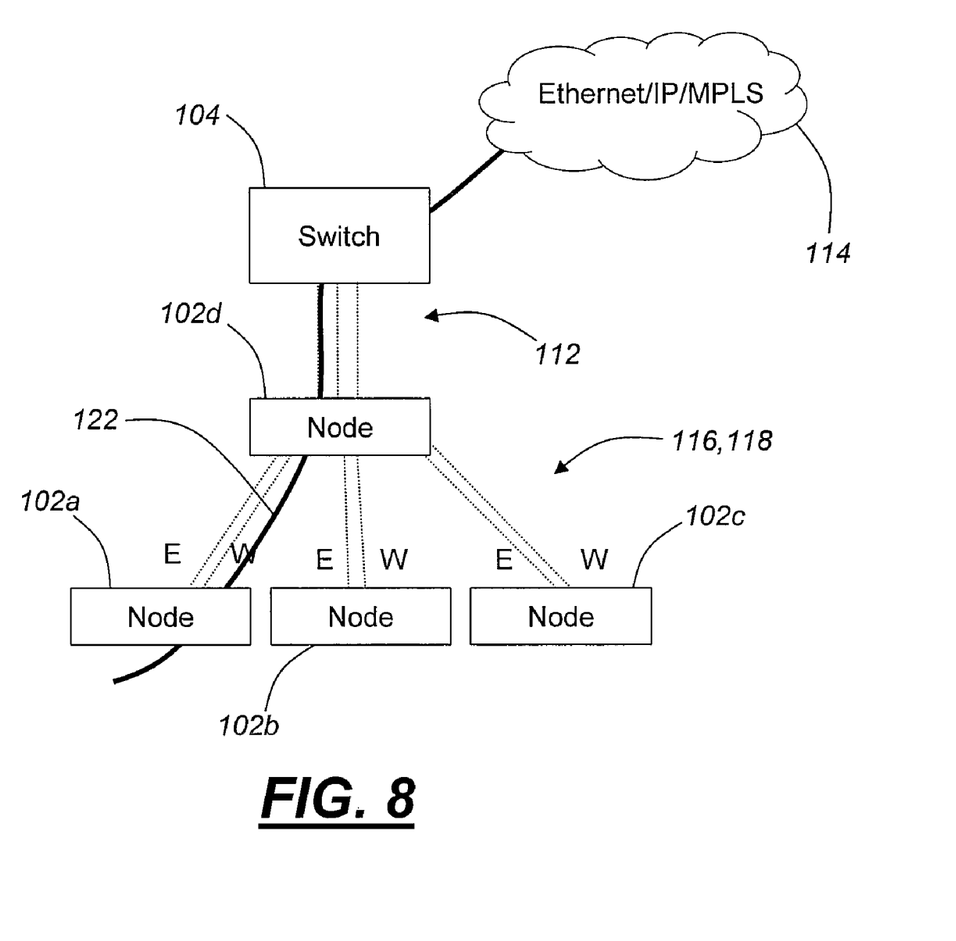
FIG. 8 is the logical tree view of FIG. 6 illustrating an exemplary flow of network traffic according to an exemplary embodiment of the present invention.

Referring to FIGS. 7 and 8, the logical tree view of FIG. 6 of the reference network 100 is illustrated showing an exemplary flow of local ring traffic 120 and network traffic 122 according to an exemplary embodiment of the present invention. In the reference network 100, the switch 104 is configured to send the add/drop, i.e. local, traffic 120 back to the ring. Also, the switch 104 is configured to send and receive network traffic 122 to/from the network 114. Both the head-end 110 and switch 104 are configured to perform VLAN cross-connects between each of the VLANs 106,108,112.

In the self-healing topology of the present invention, both the ring traffic 120 and the network traffic 122 traverse the VLAN 106 as the primary route with the VLAN 108 used as the secondary route. For the ring traffic 120, the traffic 120 is illustrated flowing from node 102a to the switch 104 and back to node 102c (through node 102d twice), and this is done on VLAN 106,112. The switch 104 is shown for illustration purposes, and those of ordinary skill in the art will recognize the local ring traffic 120 does not have to travel to the switch 104, and instead could be cross-connected at the head-end 110, i.e. node 102d.

For the network traffic 122, the traffic 122 is illustrated flowing from node 102a to node 102d on VLAN 106. At node 102d, the traffic 122 is cross-connected from VLAN 106 to VLAN 112 where it flows to the switch 104 and is sent to the network 114. For both the ring and network traffic 120,122, normal operation occurs on the primary route, i.e. VLAN 106, with the secondary route, i.e. VLAN 108, as standby.

As described herein, Ethernet OAM CCM messages are used to ensure the health of the Link Aggregation Control Protocol (LACP) path with the CCMs running over each VLAN 106,108,112. There are two sets of CCMs, one for the East VLAN 106, and one for the West VLAN 108. CCM messages are sent by both leaf nodes 102a,102b,102c and the head-end 110, i.e. node 102d. The rate of the CCM messages is adjustable (per the standards it is between 3.5 ms and 10 min.).

In the present invention, the head-end node 110 is configured to perform protection switching (through VLAN cross-connecting at the head-end 110) between the primary route, i.e. VLAN 106, and the secondary route, i.e. VLAN 108, responsive to the loss of a predetermined number of CCM messages. Setting the rate at 3.5 ms and protection switching triggered by the loss of three consecutive CCM messages yields a failure detection time of approximately 10 ms. This provides a carrier-grade, i.e. sub-50 ms, self-healing mechanism for Ethernet.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for self-healing Carrier Ethernet, comprising:
statically provisioning a first and second Ethernet path between a plurality of nodes interconnected in one of a ring and a linear chain topology, wherein one of the plurality of nodes comprises a head-end node configured to provide switching on the first and second paths for local and external network traffic;
provisioning a management channel comprising a distinct path from the first and second path based on a Virtual Local Area Network Identifier;
transmitting data from a source node on the first path;
periodically generating distinct Continuity Check Messages (CCMs) by the plurality of nodes on the management channel;
monitoring the distinct CCMs to determine a failure condition within a path comprising failure to receive a plurality of the distinct CCMs;
responsive to the failure condition, transmitting a CCM with a Remote Defect Indicator (RDI) to the source node, wherein the CCM message with the RDI is generated at a node of the plurality of nodes located on a receive side of a failed primary path; and
switching data from the first path to the second path responsive to the CCM with the Remote Defect Indicator, wherein each of the plurality of nodes switches the data to the second path upon reception at each of the plurality of nodes of the CCM with the Remote Defect Indicator;
wherein the CCMs are multicast by each of the plurality of nodes, and the one of the ring and linear chain topology are operable to constrain the multicast CCMs to traversing the one of the ring and linear chain without modification of the multicast CCMs.

2. The method for self-healing Carrier Ethernet of claim 1, wherein the first and second paths comprise one of a Virtual Local Area Network (VLAN), Multi-protocol Label Switching (MPLS) label, Provider Backbone Bridge Traffic Engineering (PBB-TE) VLAN ID (VID), and Frame Relay (FR).

3. The method for self-healing Carrier Ethernet of claim 1, wherein the plurality of interconnected nodes comprise the ring topology, and wherein the management channel comprises two IEEE 802.1ag CCM sessions for the ring, wherein the two IEEE 802.1ag CCM session comprise one in a transmit direction and one in a receive direction around the ring.

4. The method for self-healing Carrier Ethernet of claim 3, wherein generating distinct CCMs further comprises:
generating a first and second CCM message at a predetermined rate by a source node of the plurality of nodes;
transmitting the first CCM message in a first direction around the ring;
transmitting the second CCM message in a second direction around the ring, wherein the second direction is opposite from the first direction; and
removing the first and second CCM messages at the source node following a full circle on the ring.

5. The method for self-healing Carrier Ethernet of claim 4, wherein transmitting a CCM with a Remote Defect Indicator to the source node responsive to the failure condition comprises:
when a primary path fails, generating a CCM message with the Remote Defect Indicator (RDI) turned on; and
receiving the CCM message with the Remote Detect Indicator (RDI) turned on at each of the plurality of nodes indicating a failure.

6. The method for self-healing Carrier Ethernet of claim 1, wherein the monitoring to determine the failure condition comprises one of checking for the loss of a predetermined number of consecutive CCM messages for the first path, receiving a CCM message with a Remote Defect Indicator (RDI), loss of signal, and combinations thereof.

7. The method for self-healing Carrier Ethernet of claim 1, wherein the first and second path are statically provisioned through one of a northbound interface, a command line interface, an Extensible Markup Language (XML) or Session Initiation Protocol (SIP) mechanism, a Provider Backbone Transport (PBT (PBB-TE)) managed system, and combinations thereof.

8. The method for self-healing Carrier Ethernet of claim 1, wherein each of the plurality of nodes connects directly to the head-end through a dedicated VLAN providing a logical tree topology.

9. The method for self-healing Carrier Ethernet of claim 1, wherein only one of the first and second path is actively carrying traffic at a time.

10. The method for self-healing Carrier Ethernet of claim 1, wherein the monitoring to determine the failure condition comprises checking for the loss of a predetermined number of consecutive CCM messages for the first path based upon a rate of transmitting the consecutive CCM messages and providing carrier-grade switching times therewith.

11. A self-healing Carrier Ethernet ring, comprising:
a plurality of nodes interconnected in a ring topology;
a head-end node comprising one of the plurality of nodes;
a primary Ethernet path between each of the plurality of nodes and the head-end;
a protect Ethernet path between each of the plurality of nodes and the head-end;
a management path between each of the plurality of nodes and the head-end, wherein the management path is distinct from the primary and protect paths;
means for detecting a failure in the primary and protect path using the management path comprising failure to receive a predetermined number of Continuity Check Messages (CCMs) at a predetermined interval, wherein the predetermined number of consecutive CCMs and the predetermined interval are selected to provide a failure detection in less than a prescribed time required for recovery;
wherein each of the plurality of nodes is configured to switch from the primary path to the protect path responsive to detecting the failure;
primary Virtual Local Area Networks (VLANs) comprising statically provisioned VLANs between each of the plurality of nodes and the head-end node; and
protected VLANs comprising statically provisioned VLANs between each of the plurality of nodes and the head-end node;
wherein the primary path comprises the primary VLANs and the protect path comprises the protect VLANs.

12. The self-healing Carrier Ethernet ring of claim 11, wherein each of the primary and protected VLANs is passthrough intermediate nodes of the plurality of nodes and terminated at an originating node and the head-end node.

13. The self-healing Carrier Ethernet ring of claim 11, wherein the primary and protect VLANs are statically provisioned through one of a northbound interface, a command line interface, an Extensible Markup Language (XML) or Session Initiation Protocol (SIP) mechanism, a Provider Backbone Transport (PBT (PBB-TE)) managed system, and combinations thereof.

14. The self-healing Carrier Ethernet ring of claim 11, wherein responsive to switching from the primary path to the protect path, low priority traffic is dropped if there is oversubscription.

15. The self-healing Carrier Ethernet ring of claim 11, wherein the failure comprises one the loss of a predetermined number of consecutive CCM messages, receipt of a CCM message with a Remote Defect Indicator (RDI), loss of signal, and combinations thereof.

16. A logical tree topology providing a self-healing Ethernet topology, comprising:
a plurality of head-end nodes;
a plurality of nodes, wherein each node is connected to each of the plurality of head-nodes through a dedicated primary and protect Ethernet path;
a management channel based on a Virtual Local Area Network Identifier connected to each of the plurality of head-nodes and nodes, wherein multicast Continuity Check Messages (CCMs) are generated and monitored by the plurality of head-end nodes and the plurality of nodes on the management path for failure denoted by failure to receive a predetermined number of consecutive CCMs at a predetermined interval, wherein the predetermined number of consecutive CCMs and the predetermined interval are selected to provide a failure detection in less than a prescribed time required for recovery, wherein the management path is a distinct path from the primary and protect path; and wherein each of the plurality of nodes is configured to switch from the primary path to the protect path responsive to CCM message with an RDI flag;

wherein the logical tree topology is operable to constrain the path of the multicast CCMs by dictating that the multicast CCMs are received at a particular port and broadcast at another particular port at each of the plurality of head-nodes and nodes.

17. The logical tree topology providing a self-healing Ethernet topology of claim 16, wherein the primary and protect paths comprise one of a Virtual Local Area Network (VLAN), Multi-protocol Label Switching (MPLS) label, Provider Backbone Bridge Traffic Engineering (PBB-TE) VLAN ID (VID), and Frame Relay (FR).

18. The logical tree topology providing a self-healing Ethernet topology of claim 16, wherein the plurality of head-end nodes and the plurality of nodes monitor CCM messages and responsive to a loss of a predetermined number of CCM messages, transmit a CCM message with an RDI flag.

19. The logical tree topology providing a self-healing Ethernet topology of claim 18, wherein CCMs are generated at a predetermined interval from each node;

wherein each node is configured to remove CCM messages transmitted from itself following traversal of the management channel; and wherein a node is configured to transmit the CCM message with an RDI flag responsive to the loss of a predetermined number of consecutive CCM messages.

* * * * *